US009026270B2

(12) United States Patent
Poettker et al.

(10) Patent No.: US 9,026,270 B2
(45) Date of Patent: May 5, 2015

(54) REMOTE CONTROL SYSTEM FOR DRILL (71) Applicant: Caterpillar Global Mining Equipment LLC, South Milwaukee, WI (US)

(72) Inventors: Alois Poettker, Fröndenberg (DE); Timo Diekmann, Castrop-Rauxel (DE); Samuel C. Taylor, Bungendore (AU)

(73) Assignee: Caterpillar Global Mining Equipment LLC, Denison, TX (US)

( * ) Notice: Subject to any disclaimer, the term of this patent is extended or adjusted under 35 U.S.C. 154(b) by 63 days.

(21) Appl. No.: 13/895,625

(22) Filed: May 16, 2013

(65) Prior Publication Data
US 2014/0343754 A1 Nov. 20, 2014

(51) Int. Cl.
*G05D 1/00* (2006.01)
*E21B 44/00* (2006.01)

(52) U.S. Cl.
CPC ............ *G05D 1/0016* (2013.01); *G05D 1/0022* (2013.01)

(58) Field of Classification Search
USPC ................................................ 701/2; 175/24
See application file for complete search history.

(56) References Cited

U.S. PATENT DOCUMENTS

| | | | |
|---|---|---|---|
| 6,918,453 B2 * | 7/2005 | Haci et al. ......................... | 175/26 |
| 7,755,761 B2 * | 7/2010 | Mathis et al. ................. | 356/399 |
| 8,387,720 B1 * | 3/2013 | Keast et al. ..................... | 175/24 |
| 2008/0173480 A1 * | 7/2008 | Annaiyappa et al. ........... | 175/24 |
| 2010/0001998 A1 * | 1/2010 | Mandella et al. ............. | 345/419 |
| 2010/0249957 A1 | 9/2010 | Price | |
| 2012/0191269 A1 | 7/2012 | Chen et al. | |

* cited by examiner

*Primary Examiner* — Thomas G Black
*Assistant Examiner* — Tyler Paige
(74) *Attorney, Agent, or Firm* — Foley & Lardner LLP (57) ABSTRACT

Mobile drilling devices and systems, methods, and computer-readable media for controlling such devices are provided. One method includes receiving user input from a user of a mobile computing device. The method further includes transmitting data based on the user input from the mobile computing device to a control circuit of a mobile drilling device via a wireless network connection. The method further includes generating a plurality of control signals based on the data received from the mobile computing device. Each of the plurality of control signals is configured to control movement of a separate one of a plurality of movement devices of the mobile drilling device. The plurality of movement devices are configured to move the mobile drilling device between locations.

19 Claims, 6 Drawing Sheets

REMOTE CONTROL SYSTEM FOR DRILL

TECHNICAL FIELD

The present disclosure relates generally to the field of control of drill devices. More specifically, the present disclosure relates to systems and methods for remotely controlling movement of a mobile drilling device (e.g., a large industrial drilling device) using a mobile computing device, such as a tablet computer, or other control device.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Industrial drilling devices or drilling rigs are often used for applications such as mining, excavation, drilling and boring, blast hole drilling, and/or other types of operations. Such drilling devices may have a vertical drill tower constructed from structural members such as beams that may support drill rods and other components used to drill a hole into the ground. Some such drilling devices may be mobile drilling devices that are configured to be moved from one location to another to drill a series of holes. Movement of a drilling device may be controlled using control devices, such as levers, within an operator's cab on the mobile drilling device.

Mobile computing devices are sometimes used to remotely control devices. For example, U.S. Patent Application Publication No. 2012/0191269 of Chen et al., which published on Jul. 26, 2012, discloses using a smart phone to control an unmanned vehicle. A drive control is provided on the smart phone and allows an operator to direct the unmanned vehicle to move forward, reverse, right, and left. The drive controller can be a *variable* speed joystick.

Conventional mobile drilling devices cannot be remotely controlled in such a manner. Such mobile drilling devices require an operator to control movement of the mobile drilling device from within the operator's cab. This requires at least one operator to be physically present on each mobile drilling device in order to operate the device. Additionally, such devices typically include separate controls for each movement device (e.g., each tram) that moves the mobile drilling device from one location to another. For example, a typical control device for a mobile drilling rig that has two trams for movement may have two separate levers, one controlling a left tram and one controlling a right tram. The operator must carefully coordinate operation of both levers simultaneously to effectuate the desired movement of the mobile drilling rig.

The systems and methods of the present disclosure solve one or more problems set forth above and/or other problems of the prior art.

SUMMARY

One embodiment of the disclosure relates to a method that includes receiving, via a user interface of a mobile computing device, user input from a user of the mobile computing device. The method further includes transmitting data based on the user input from the mobile computing device to a control circuit of a mobile drilling device via a wireless network connection. The method further includes generating, using the control circuit, a plurality of control signals based on the data received from the mobile computing device. Each of the plurality of control signals is configured to control movement of a separate one of a plurality of movement devices of the mobile drilling device. The plurality of movement devices are configured to move the mobile drilling device between locations.

Another embodiment relates to a computer-readable storage medium having instructions stored thereon that, when executed by a processor of the mobile computing device, cause the processor to perform operations including providing, on a display device (e.g., a touch-screen display device) of the mobile computing device, a display image comprising a two-dimensional drill movement control portion. The operations further include receiving user input representative of a user selection of one or more points within the two-dimensional drill movement control portion (e.g., user movement across a part of the touch-screen display device corresponding to the two-dimensional drill movement control portion). The operations further include transmitting data based on the user input to a mobile drilling device over a wireless network connection. The data is configured to cause the mobile drilling device to control movement of a plurality of movement devices of the mobile drilling device based on the user input representative of the user movement across a part of the touch-screen display device corresponding to the two-dimensional drill movement control portion. The plurality of movement devices are configured to move the mobile drilling device between locations.

Another embodiment relates to a mobile drilling device including a control circuit that includes a processor operably coupled to at least one memory. The control circuit is configured to receive, from a mobile computing device including a touch-screen display device over a wireless network connection, data based on user input representative of a user selection of one or more points within a two-dimensional drill movement control portion (e.g., representative of movement across a part of the touch-screen display device corresponding to the two-dimensional drill movement control portion) of a display image provided on the touch-screen display device of the mobile computing device. The control circuit is further configured to generate a plurality of control signals based on the data received from the mobile computing device. Each of the plurality of control signals is configured to control movement of a separate one of a plurality of movement devices of the mobile drilling device. The plurality of movement devices are configured to move the mobile drilling device between locations In some embodiments, the control circuit is configured to generate the plurality of control signals to control movement of all of the plurality of movement devices based on user input representative of a single touch input selection of one or more points within the two-dimensional drill movement control portion.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. The term "WiFi" as used herein refers to any system, method, or device that conforms to the Institute of Electrical and Electronics Engineers' (IEEE) 802.11 standard for wireless communications.

Referring generally to the figures, systems, methods, and computer-readable media for use in remotely controlling a mobile drilling device using a mobile computing device, such as a tablet computer, are shown and described according to exemplary embodiments. A mobile computing device may be configured to present a user with a user interface that may be manipulated by the user to control movement of the mobile drilling device. The mobile drilling device may have multiple movement devices, such as trams, that are configured to move the drilling device from one location to another. The mobile drilling device may include valves or other devices configured to control movement of the trams or other movement devices. For a mobile drilling device with two trams, movement of the trams may typically be controlled by separate levers, each of which controls movement of a single tram and is configured to move in one dimension (e.g., backwards and forwards).

In some embodiments, the user interface may provide the user with a two-dimensional drill movement control portion that can be used to control movement of all of the movement devices (e.g., both trams) using a single input movement. For example, the user interface may include a touch-screen display interface, and the user may touch a virtual joystick provided in the display image and move it in a direction of desired movement of the drilling device. In some embodiments, the two-dimensional drill movement control portion may be a rectangular-shaped area. In some embodiments, the two-dimensional drill movement control portion may be or include a Cartesian control interface. The direction and speed of movement of the drilling device may be determined based on the direction and length of movement of the joystick with respect to a fixed point (e.g., a center starting point) in the two-dimensional drill movement control portion. Data based on the user input may be transmitted via a wireless network connection (e.g., WiFi, cellular, etc.) to a control circuit of the mobile drilling device.

The mobile drilling device may be configured to receive the data from the mobile computing device and generate control signals configured to control the trams or other movement devices. In some embodiments, the two-dimensional user input may be mapped (e.g., by the mobile drilling device and/or mobile computing device) to appropriate movements of the separate levers and/or devices (e.g., valves) used to control movement of the trams or other movement devices. For example, user input in the two-dimensional drill movement control portion may be transformed into movements of each of the valves that control the two separate trams of a drilling device corresponding to the desired movement of the drilling device represented by the user input. The generated control signals may each be used to control movement of a separate one of the movement devices for the mobile drilling device.

Figure 1:
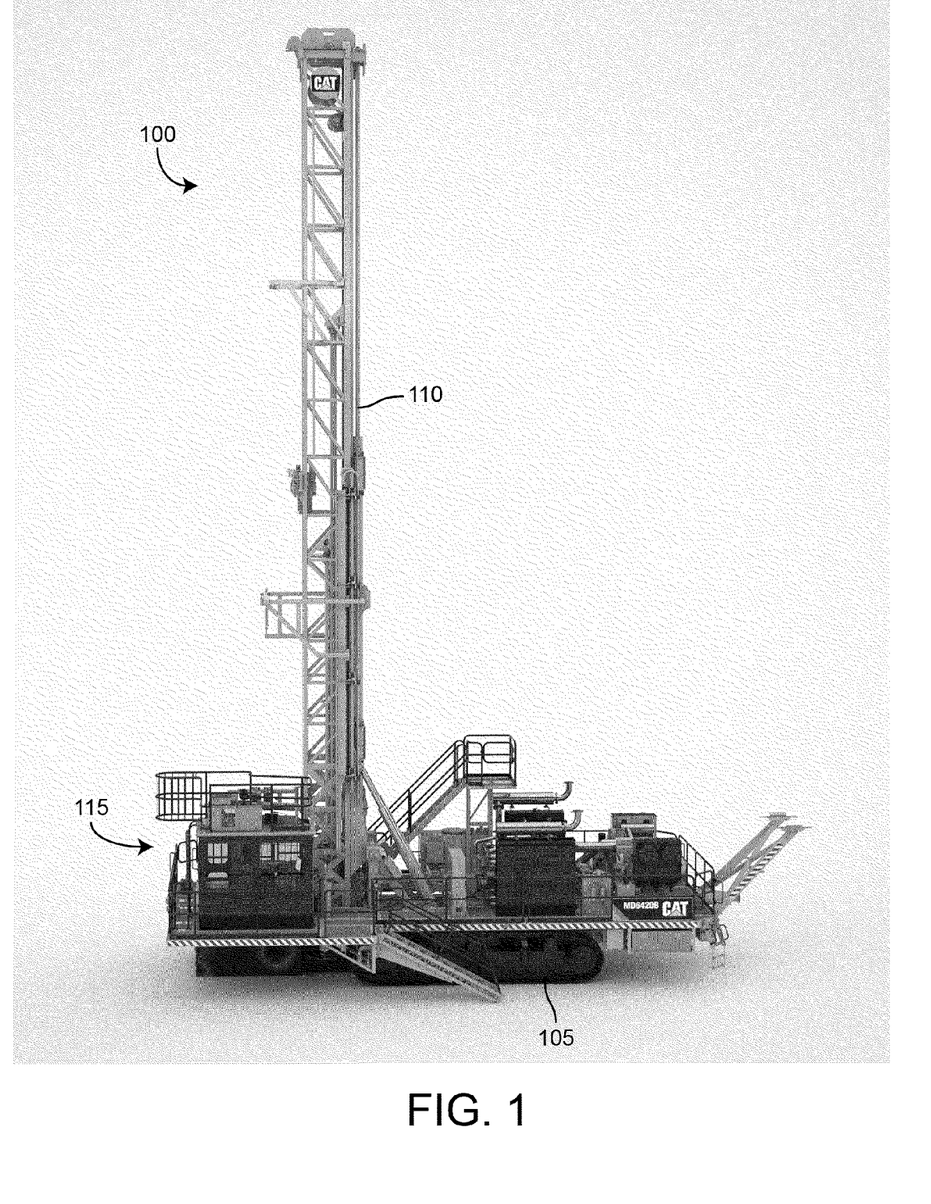
FIG. 1 is an illustration of a mobile drilling device according to an exemplary embodiment.

Referring now to FIG. 1, an example mobile drilling device 100 is shown according to an exemplary embodiment. In the illustrated embodiment, device 100 is a portable drilling rig having a platform that is movable via two trams 105 (one of which is visible in FIG. 1), one on each side of the rig. Device 100 includes a vertical drill tower 110 constructed of structural members of such steel beams and reinforcing supports. Drill tower 110 may include a drill carousel that is configured to support a drill string including multiple drill extenders or other drill components that are designed to drill into the ground beneath a platform of device 100. Device 100 may allow a drilling operation to progress into a drill hole through the use of a string of drill extenders. Once a drilling operation at one location has been completed, trams 105 may be used to move device 100 to another location at which another hole may be drilled.

Device 100 may include a cab 115 (e.g., a booth) in which controls are provided for use by an operator to control various functions of device 100. For example, cab 115 may provide controls for controlling the drilling equipment, such as for starting/stopping the drill or changing the speed of drilling. Cab 115 may provide an interface for controlling drill tower 110, such as for moving drill tower 110 between a vertical drilling orientation in which the drill may be used to bore into the ground beneath device 100 and a change-out orientation in which drill tower 110 is tilted to change drill extenders (e.g., pipes, rods, etc.) and/or tools (e.g., bits, hammering tools, etc.).

Cab 115 may provide one or more interface components configured to control movement of trams 105. For example, cab 115 may include two levers, each of which may be configured to control movement of one tram 105. For example, movement of a left lever in the forward direction may cause a left tram to rotate in a direction that propels the left side of device 100 forward, and movement of a right level in the forward direction may cause a right tram to rotate in a direction that propels the right side of device 100 forward. An operator may manipulate both levers together to effectuate movement of the entire device 100 (e.g., to move device 100 forward or backward in a straight line). In some embodiments, signals from circuits associated with the levers may be sent to a control circuit of device 100, and the control circuit may convert the signals into control signals for devices (e.g., valves) that control movement of trams 105. In some embodiments, the circuits associated with the levers may transmit signals directly to the valves or other devices that control movement of trams 105. In some embodiments, a lockout switch configured to allow device 100 to be controlled remotely rather than using the controls within cab 115 may be included within cab 115 and/or in an interface on a mobile computing device used to remotely control device 100. In some embodiments, device 100 may not include cab 115 and may instead be controlled exclusively by a remote device.

Figure 2:
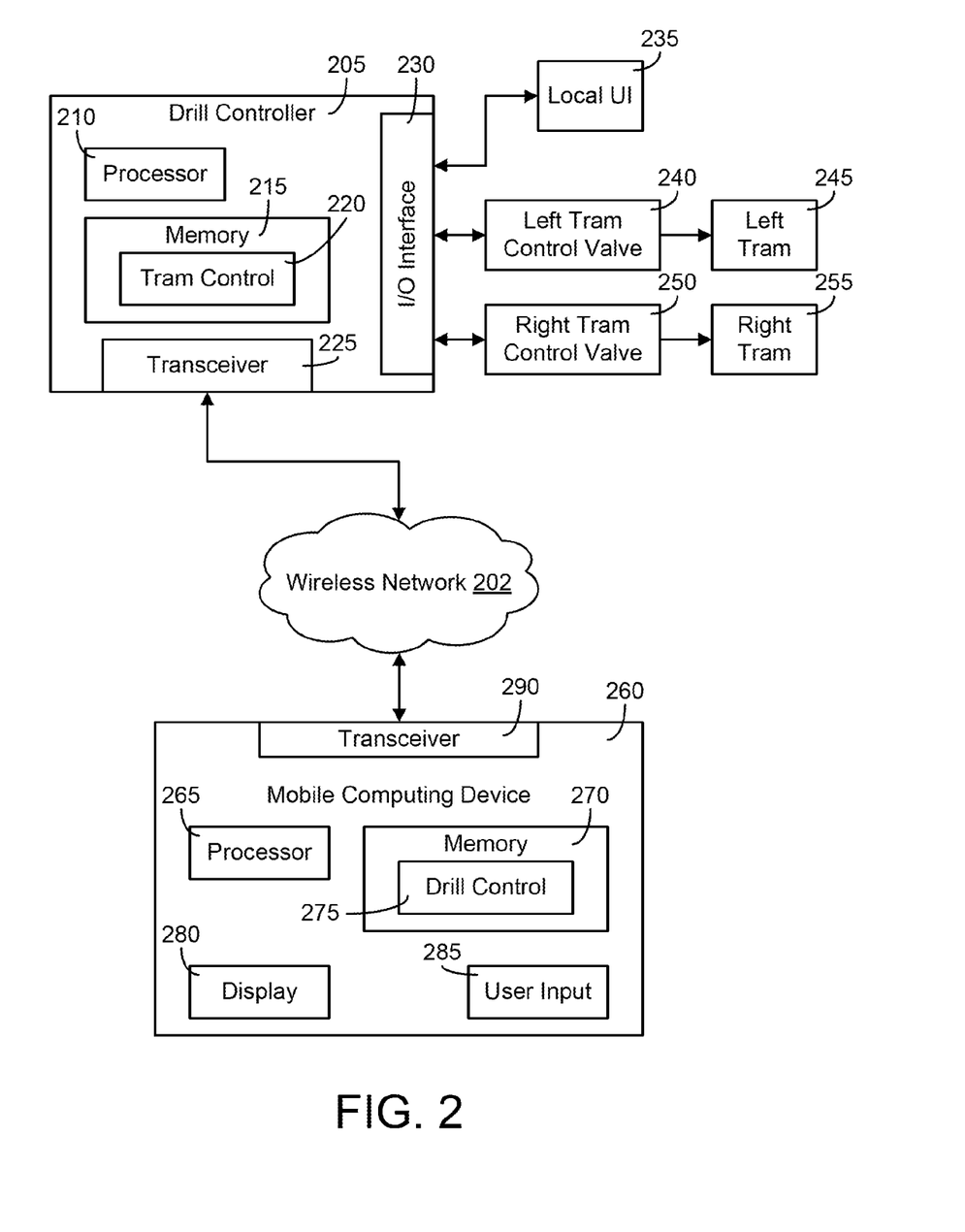
FIG. 2 is a block diagram of a system for controlling movement of a mobile drilling device according to an exemplary embodiment.

Referring now to FIG. 2, a system that may be used to remotely control movement of a mobile drilling device is shown according to an exemplary embodiment. The system may include a drill controller 205 included within the mobile drilling device and a mobile computing device 260 configured to communicate with drill controller 205 over a wireless network connection 202. Mobile computing device 260 may be a tablet computer, a mobile (e.g., cellular) telephone, a laptop, or any other type of portable computing device. Drill controller 205 and mobile computing device 260 may be configured to communicate with one another over wireless network connection 202 using a transceiver 225 and a transceiver 290, respectively. Wireless network connection 202 may be or include a WiFi connection, a cellular data connection, or any other type of wireless connection (e.g., over a wireless local or wide area network). Drill controller 205 and mobile computing device 260 may include a processor 210 and processor 265, respectively, which may be any type of processing circuit (e.g., FPGA, CPLD, ASIC, etc.). Drill controller 205 and mobile computing device 260 may include a memory 215 and memory 270, respectively, which may be or include any type of computer or machine-readable storage medium (e.g., RAM, ROM, flash storage, optical media, hard drive, etc.).

Drill controller 205 may include an input/output (I/O) interface 230 configured to communicate with other components or devices of the mobile drilling device. For example, drill controller 205 may transmit control signals through I/O interface 230 to a left tram control valve 240 and a right tram control valve 250 respectively configured to control movement of a left tram 245 and a right tram 255 of the drilling device. In some embodiments, drill controller 205 may receive feedback signals that are used in controlling movement of left tram 245 and right tram 255 from sensors associated with left tram control valve 240 and right tram control valve 250 through I/O interface 230. In some embodiments, drill controller 205 may communicate with a local user interface 235 of the drilling device, such as for receiving commands from local user interface 235 to control features of the drilling device and/or for providing indicators and/or alerts to the user to inform the user of the status of various components of the drilling device. In some embodiments, drill controller 205 may generate control signals for use in controlling left tram control valve 240 and/or right tram control valve 250 using a tram control module 220 stored in memory 215 (e.g., implemented as computer or machine-executable instructions stored in memory 215). While the illustrated exemplary embodiment shows a system for use with a drilling device that has two trams or other movement devices (e.g., wheels), it should be appreciated that the system may be used with any drilling device having two or more movement devices.

Mobile computing device 260 includes a drill control module 275 stored in memory 270 that is configured to provide an interface through which a user can remotely control movement of movement devices of the drilling device (e.g., trams 245 and 255). Drill control module 275 may be configured to display a user interface (e.g., graphical user interface) on a display device 280 of mobile computing device 260 and receive input from a user via a user input device 285 of the mobile computing device. In some embodiments, display device 280 and user input device 285 may be combined as a touch screen display device configured to receive touch input from a finger or other stylus device of the user. Drill control module 275 may display a control interface and receive input from the user relative to the touch interface. Drill control module 275 may then wirelessly transmit data based on the input to drill controller 205, which may control operation of left tram control valve 240 and right tram control valve 250 based on the received data.

Figure 3:
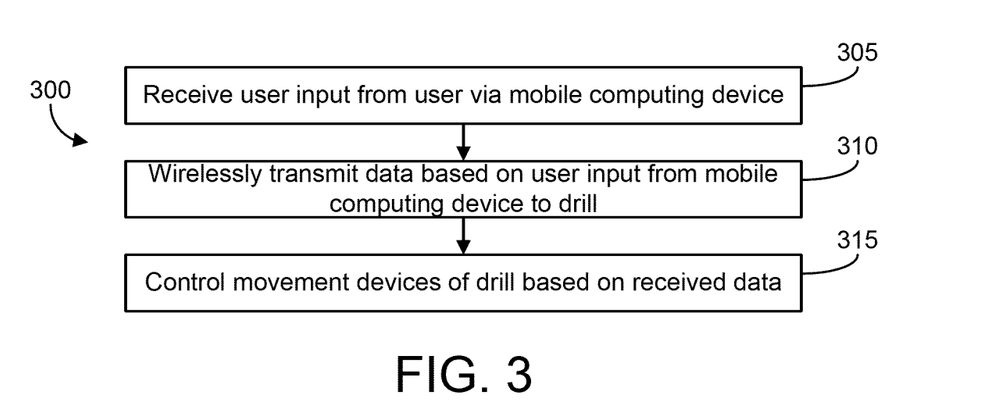
FIG. 3 is a flow diagram of a process for controlling movement of a mobile drilling device according to an exemplary embodiment.

FIG. 3 illustrates a process 300 that may be used by mobile computing device 260 and drill controller 205 to allow remote control of trams 245 and 255 according to an exemplary embodiment. Mobile computing device 260 may receive input from a user relative to an interface displayed on display device 280 (305). In some embodiments, drill control module 275 of mobile computing device 260 may be configured to display a two-dimensional drill movement control portion within a display image shown on display device 280 and detect user input (e.g., touch input) provided with respect to (e.g., within) the two-dimensional drill movement control portion. In some embodiments, the two-dimensional drill movement control portion may be or include a region (e.g., rectangular, circular, ovular, trapezoidal, etc.) within which a user can touch to effect corresponding movement of the drilling device. In some embodiments, the two-dimensional drill movement control portion may be or include a Cartesian control interface. In some embodiments, a user may remotely control the drilling device by touching a point within the drill movement control portion, and the direction and speed of movement of the drilling device may be determined based on the direction and distance between the selected point and a reference (e.g., center) point. In some embodiments, the user may provide input by moving the stylus (e.g., finger) across a part of the drill movement control portion, and the direction and speed of movement of the drilling device may be determined based on the movement across the drill movement control portion. For example, a user may press against a starting point within the drill movement control portion and move his finger to a different point within the drill movement control portion. While the user's finger remains against display device 280, the drill device may be remotely controlled to move in a direction and at a speed based on the movement of the user's finger. In some embodiments, when the user removes his finger from display device 280, movement of the drilling device may stop. In some embodiments, drill control module 275 may be configured to display a virtual joystick at a reference (e.g., center or starting) location within the drill movement control portion, and the virtual joystick may be moved by the user through touch input. In some embodiments, a single touch input (e.g., single touch of a point or single movement without removing the stylus from display device 280) may be used to control movement of both tram 245 and tram 255).

Mobile computing device 260 may be configured to wirelessly transmit data based on user input from mobile computing device 260 to drill controller 205 (310). In various embodiments, the data may be transmitted over a WiFi connection, a cellular data connection, or another type of wireless connection. Once the data is received, drill controller 205 may be configured to control the movement devices of the drilling device (e.g., left tram control valve 240 and right tram control valve 250, which in turn control movement of left tram 245 and right tram 255, respectively) based on the received data (315). In some embodiments, drill controller 205 may be configured to control movement of the drill by generating control signals configured to control left tram control valve 240 and right tram control valve 250. For example, a first control signal may be generated to control the movement of the left side of the drilling device and transmitted to left tram control valve 240, and a second control signal may be generated to control the movement of the right side of the drilling device and transmitted to right tram control valve 250.

In some embodiments, mobile computing device 260 and/or drill controller 205 may be configured to map user input representing selected points and/or movement within the drill movement control portion on mobile computing device 260 to movement of left tram control valve 240 and right tram control valve 250 and/or movement of physical left and right hand control levers that would typically be used to control the valves (e.g., within cab 115). In some embodiments, movement of a virtual joystick within the drill movement control area may be transformed into multiple outputs, each representing the desired movement of the left and right sides of the drilling device, using a function taking the coordinates and/or movement of the virtual joystick as an input. In some embodiments, the user input movement may be mapped to the movement of the individual movement devices using a table or database that correlates the movements or coordinates within the drill movement control portion to output data corresponding to each movement device. In some embodiments, the mapping or transformation may be performed at mobile computing device 260, and the data transmitted to drill controller 205 may include data corresponding to each of the separate movement devices. In some embodiments, mobile computing device 260 may be configured to transmit data to drill controller 205 that is representative of the received user input, and drill controller 205 may be configured to perform the matching/transformation.

Figure 4:
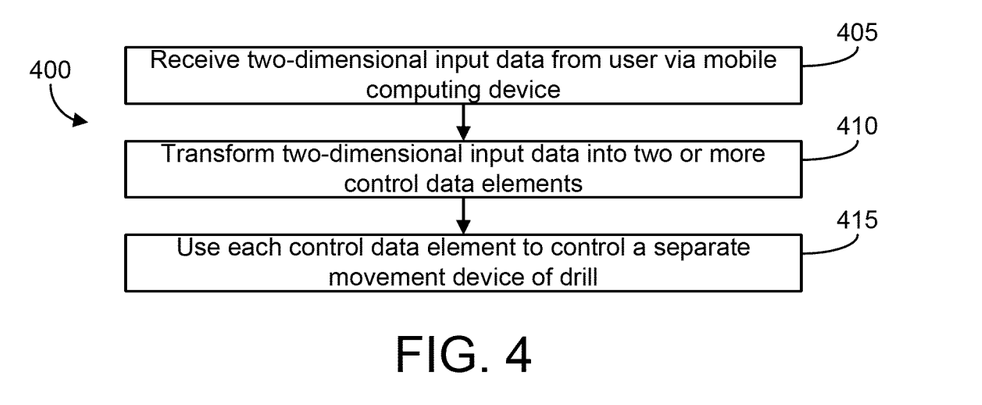
FIG. 4 is a flow diagram of another process for controlling movement of a mobile drilling device according to an exemplary embodiment.

FIG. 4 illustrates a process 400 that may be used by mobile computing device 260 and/or drill controller 205 to generate data elements (e.g., control signals) from input data received from the user according to an exemplary embodiment. Mobile computing device 260 may receive two-dimensional input data from the user corresponding to a two-dimensional drill movement control portions displayed on display device 280 (405). The input data may represent user point selections or movements in Cartesian coordinates, radial coordinates, or another type of representation. Mobile computing device 260 and/or drill controller 205 may be configured to transform the two-dimensional input data into two or more control data elements, such as control signals or data subsequently used by drill controller 205 to generate control signals (410). As discussed above, the input data may be transformed into control data elements by applying a function to the input data, mapping the input data to output control data elements according to a table or database, or in some other manner. Drill controller 205 may use each control data element to control a separate movement device of the drilling device (415). For example, one control data element may be generated and used to control left tram control valve 240, which in turn controls left tram 245, and a separate control data element may be generated and used to control right tram control valve 250, which in turn controls right tram 255. The generated control signals may be configured to separately control a speed and direction of rotation of each of left tram 245 and right tram 255 to effectuate the speed and direction of desired movement of the drilling device reflected in the two-dimensional input provided by the user via mobile computing device 260.

Figure 5:
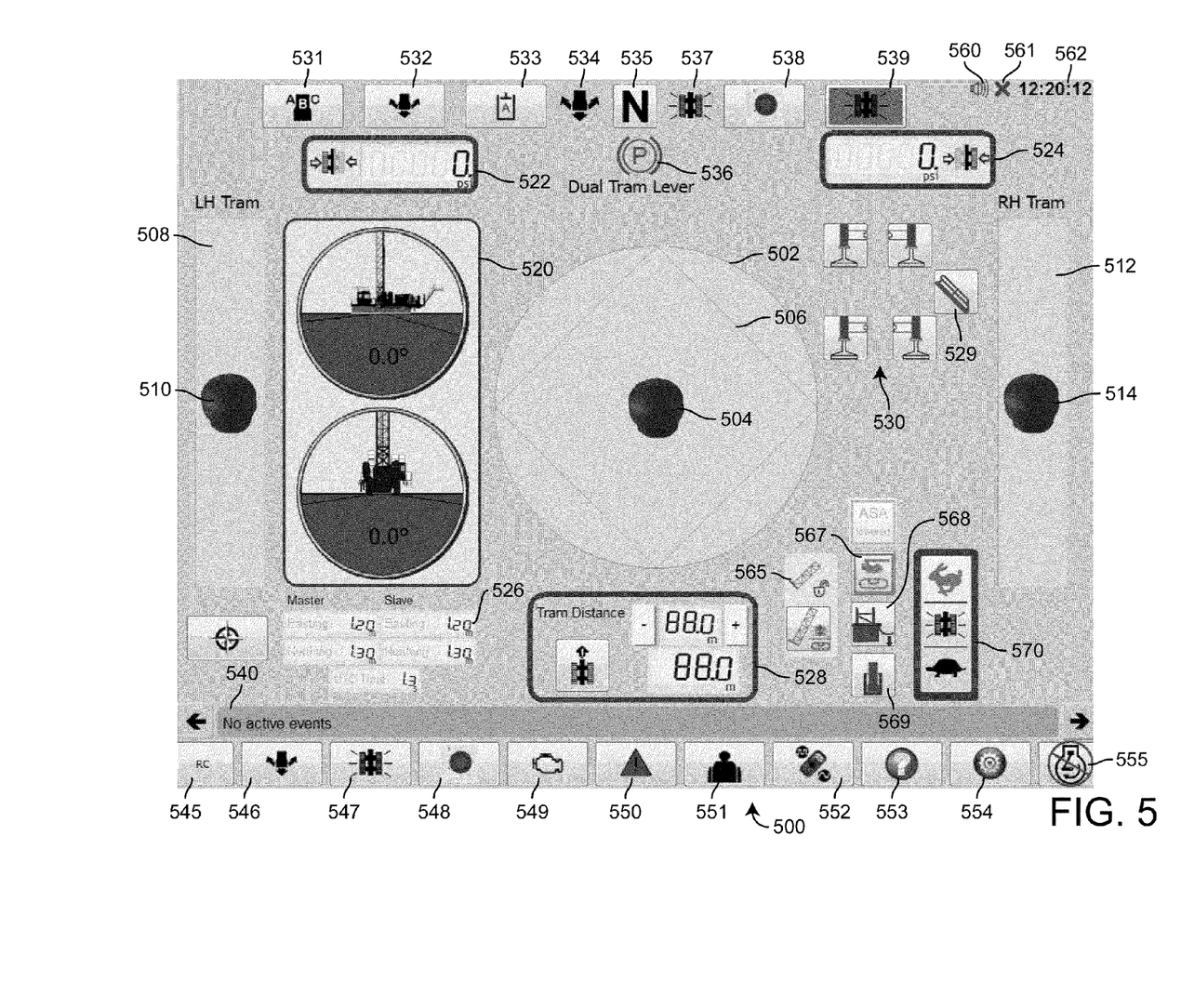
FIG. 5 is an illustration of a display image that may be presented on a mobile computing device according to an exemplary embodiment.
Figure 6:
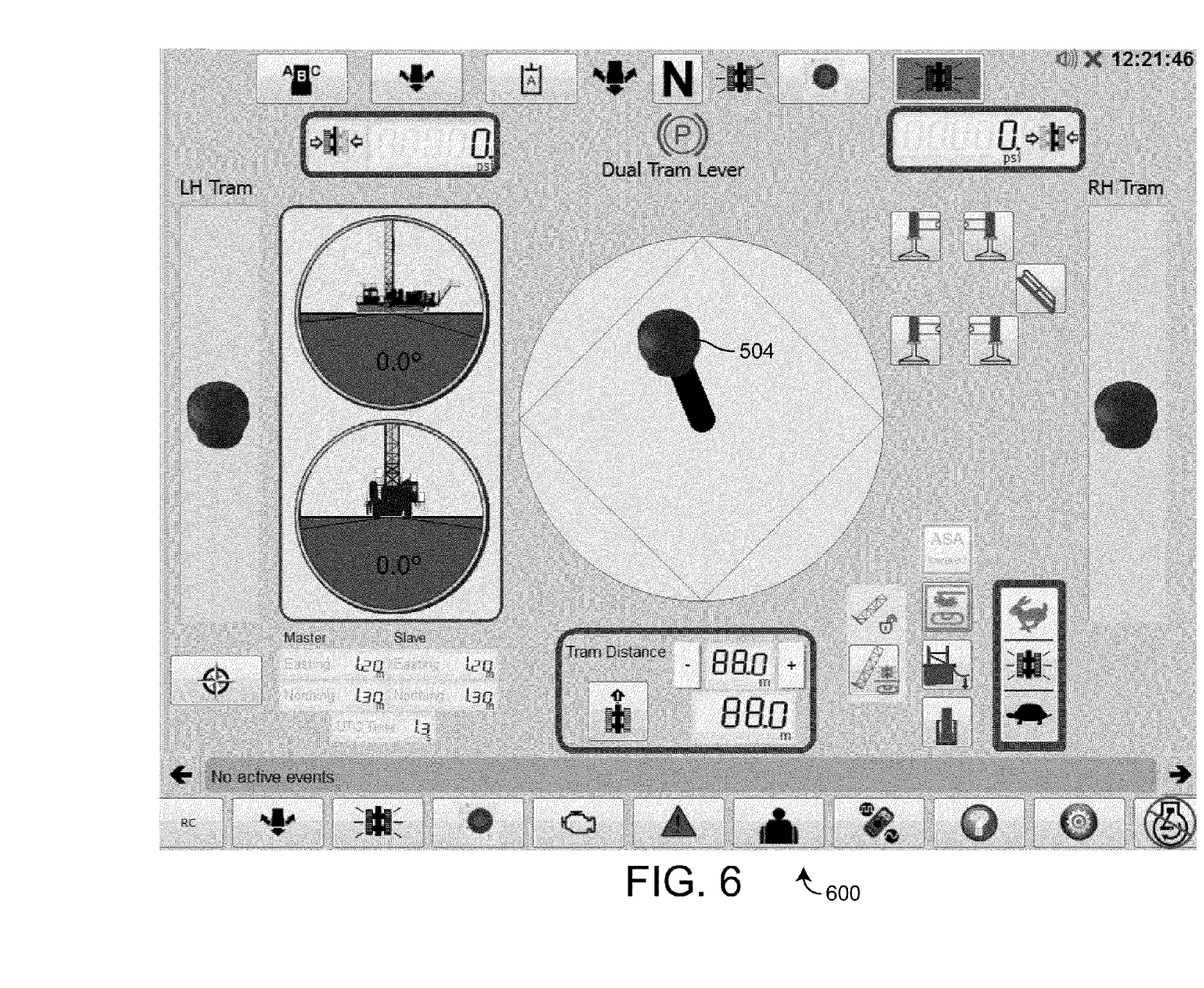
FIG. 6 is an illustration of the display image of FIG. 5 in which a user has moved a two-dimensional movement control joystick according to an exemplary embodiment.

Referring now to FIG. 5, a display image of an interface 500 that may be presented on mobile computing device 260 to allow a user to remotely control movement of a mobile drilling device is shown according to an exemplary embodiment. Interface 500 may be configured for presentation on a touchscreen display device. Interface 500 includes a two-dimensional drill movement control portion 502 having a virtual joystick 504 and a rectangular control range 506. When a user touches joystick 504 and moves it within rectangular control range 506, mobile computing device 260 and drill controller 205 are configured to cause movement of the drilling device corresponding to the movement of the joystick. For example, if the user moves the joystick to the upper right, drill controller 205 is configured to separately control trams 245 and 255 to move the drilling device forward and to the right. If the user moves the joystick to the lower left, drill controller 205 is configured to control trams 245 and 255 to move the drilling device backward and to the left. An illustration of a display image 600 that may result from the user moving the joystick to the upper left is shown in FIG. 6. Referring again to FIG. 5, the joystick may default to the center location illustrated in FIG. 5, and movements caused by user input may be processed with respect to this default center point. For example, the further away from the center point the user moves joystick 504, the faster the resultant movement of the drilling device may be. Movement of joystick 504 may be constrained to the area within rectangular control range 506, and movement within rectangular control range 506 may be mapped to movements of valves 240 and 250 and/or physical levers normally used to control valves 240 and 250 (e.g., within cab 115).

In some embodiments, the control interface presented to the user may also provide separate controls for each of the movement devices (e.g., separate levers), and the user may use either the separate levers or the two-dimensional drill control portion to control movement of the drilling device. Interface 500 includes a left tram control portion 508 and a right tram control portion 512 including a virtual left tram lever 510 and a virtual right tram lever 514, respectively. The user may drag virtual left tram lever 510 forward or backward to cause movement of left tram 245 in the forward or backward directions. The user may drag virtual right tram lever 514 forward or backward to cause movement of right tram 255 in the forward or backward directions. In some embodiments, virtual left tram lever 510 and a virtual right tram lever 514 may be configured to mimic the functionality of physical levers that may be provided within cab 115 and normally used to move trams 245 and 255.

In some embodiments, interface 500 may be configured to provide various other controls and/or information that may be configured to monitor and/or control trams 245 and 255 and/or various other features of the drilling device. For example, a left tram pressure indicator 522 and a right tram pressure indicator 524 may indicate a pressure associated with left tram control valve 240 and right tram control valve 250, respectively. Inclination gauges 520 may provide information about an orientation or inclination of the drilling device. Location indicators 526 may provide a heading of the drilling device in reference to GPS positioning. A tram distance meter 528 may provide a distance that the tram has traveled (e.g., from a starting point). Jack status indicators 530 may provide a status of one or more jacks of the drilling device, and ladder status indicator 529 may provide a status of a ladder of the drilling device. Mast lock indicator 565 may provide an indication of whether the mast is locked in position and may allow a user to override a mast lock or unlock condition. Drill leveled indicator 567 indicates whether the drilling device is currently within stability limits. Dust curtain indicator 568 may indicate a current status of a dust curtain of the drilling device and may allow a user to override the status (e.g., lift or lower the dust curtain). Pipe in hole indicator 569 may indicate whether a drill pipe is currently in a drill hole and may allow a user to override the status. Tram speed selection button 570 may allow a user to increase or decrease a speed of trams 245 and 255 in response to movement of joystick 504 and/or levers 510 and 514. Event status bar 540 indicates whether there are any events or alerts associated with the drilling device of which the user should be made aware. Drill mode indicator 534 indicates a current mode of the drilling device (e.g., drilling, halted, etc.). Neutral mode selection button 535 may be selected to place the drilling device in a neutral mode (e.g., not moving). Parking break indicator 536 indicates whether a parking break of the drilling device is currently activated. Tram mode indicator 537 indicates a current mode of trams 245 and 255 (e.g., moving or not moving). Alarm indicator 560 indicates any currently active alarms on mobile computing device 260, communication status indicator 561 indicates whether any wireless communication methods of mobile computing device 260 are active (e.g., cellular data or WiFi), and time indicator 562 indicates a current local time of mobile computing device 260.

In some embodiments, other interfaces or display images may be provided within an application executed on mobile computing device 260. For example, an auto bit change button 531 may be selected to show settings relating to bits of the drilling device, a drill remote control screen button 532 may show an interface used to remotely control functions of the drill, an auxiliary remote control screen button 533 may show an interface used to remotely control auxiliary devices of the drilling device, a level remote control screen button 538 may show an interface relating to controlling an orientation of the drilling device, and a tram remote control screen button 539 may show interface 500. Other buttons may be used to navigate to various other interfaces for controlling and/or monitoring various other features of the drilling device, such as remote control main screen button 545, drill screen button 546, tram screen button 547, level screen button 548, engine screen button 549, event screen button 550, login screen button 551 (e.g., for authenticating the user and/or mobile computing device 260), diagnostics screen button 552, help screen button 543, settings screen button 544, and/or stop engine button 555.

Figure 7:
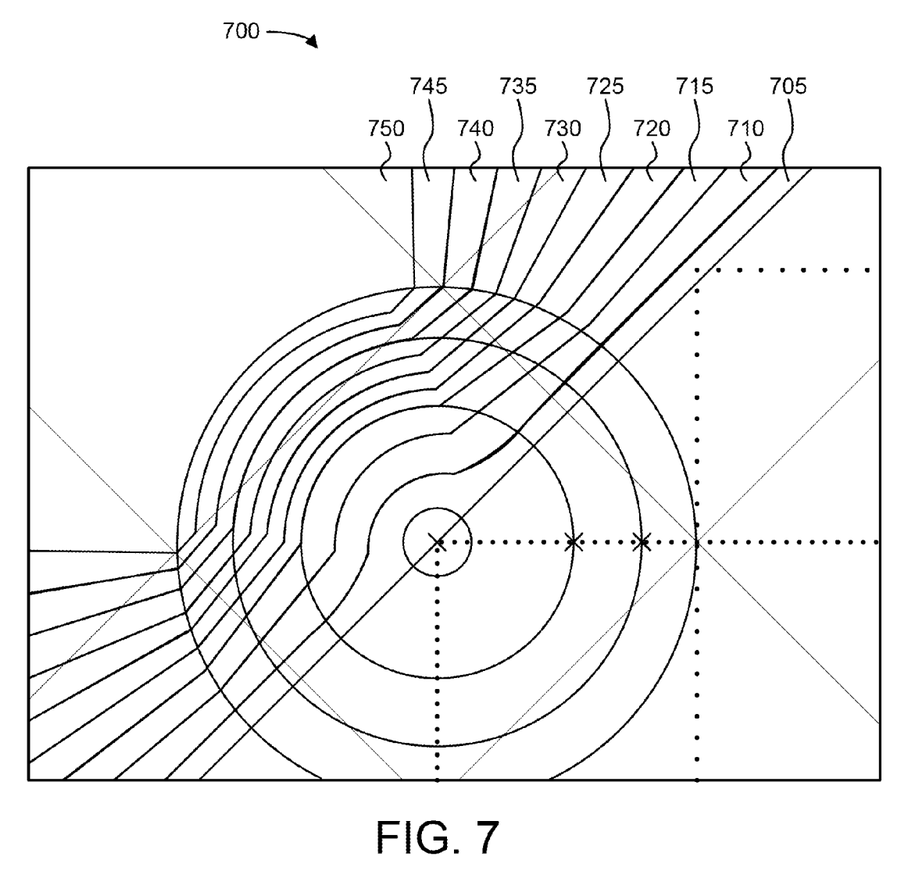
FIG. 7 is an illustration of a control map for a two-dimensional drill movement control area according to an exemplary embodiment.

Referring now to FIG. 7, a control map 700 for a two-dimensional drill movement control area is shown according to an exemplary embodiment. Control map 700 illustrates how inputs on a two-dimensional drill movement control area may be mapped to corresponding movements of a single movement device (e.g., tram/track) in a single direction. Control map 700 includes several different areas in which input may be provided. For example, a user may touch an area or drag a virtual joystick into the area to effectuate movement of the movement device. In the illustrated embodiment, input in an area 705 may cause the movement device to move at 10% of a maximum speed, input in another area 710 may result in movement at 20% of the maximum speed, and so on (i.e., such that the areas would correspond with speeds as a percentage of maximum speed as follows: area 715 (30%), area 720 (40%), area 725 (50%), area 730 (60%), area 735 (70%), area 740 (80%), area 745 (90%), area 750 (100%, or the maximum speed)). In some embodiments, instead of discrete areas, the movement may be based on a substantially continuous gradient of movement from the center to an outer portion of the movement control area. In some embodiments, a separate control map including several zones or a gradient of movement may be utilized in the two-dimensional drill movement control area to determine the resulting movement of each of the movement devices.

Industrial Applicability

The disclosed system for remotely controlling a drilling device may be used with any kind of drilling device, such as the industrial drilling rig illustrated in FIG. 1. The system may allow the drilling device to be controlled remotely from a mobile computing device, such as a tablet computer or a smartphone. In some embodiments, the system may enable the drilling device to be controlled remotely from the mobile computing device in addition to locally using controls in an operator's cab. In some embodiments, the system may provide for a drilling device to be controlled exclusively through remote control and not include an operator's cab.

Referring to FIG. 2, drill controller 205 and mobile computing device 260 may be used together to allow for remote control of a drilling device such as the device illustrated in FIG. 1. Mobile computing device 260 may be configured to receive input from a user, such as through a touch-screen display device. The input may be representative of user selection or movement associated with a drill control portion of an interface provided within a display image on the touch-screen display device. Data based on the input may be transmitted wirelessly to drill controller 205, and drill controller 205 may use the received data to generate control signals to control movement of the drilling device (e.g., a separate control signal for each movement device). For example, drill controller 205 may generate a first control signal used to control left tram control valve 240, which in turn controls left tram 245, and a second control signal to control right tram control valve 250, which controls right tram 255.

The present disclosure discusses systems and methods that can be used to control a mobile drilling device using a mobile computing device. It should be understood that, in some embodiments, the device being controlled may not be a drilling device but may instead be a mining shovel (e.g., hydraulic shovel or rope shovel), a mining truck or tractor, another type of mining equipment or vehicle, and/or any other type of mobile/propelled device. Further, in some embodiments, the device used to provide control may not be a mobile computing device (e.g., a desktop computing device) and/or may not be remote from the drilling device (e.g., a touch screen dashboard display provided within the operator's cab).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials and components, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure may contemplate methods, systems and program products on any machine-readable storage media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can comprise RAM, ROM, EPROM, EEPROM, CD-ROM or other optical disk storage, magnetic disk storage or other magnetic storage devices, flash memory, or any other medium which can be used to carry or store desired program code in the form of machine-executable instructions or data structures and which can be accessed by a general purpose or special purpose computer or other machine with a processor. Machine-readable storage media are tangible storage media and are non-transitory (i.e., are not merely signals in space). Combinations of the above are also included within the scope of machine-readable storage media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed is:

1. A method for controlling a drill, comprising:
receiving, via a user interface of a mobile computing device, user input from a user of the mobile computing device;
transmitting data based on the user input from the mobile computing device to a control circuit of a mobile drilling device via a wireless network connection, wherein the wireless network connection comprises at least one of a WiFi connection or a cellular data network connection; and
generating, using the control circuit, a plurality of control signals based on the data received from the mobile computing device, wherein each of the plurality of control signals is configured to control movement of a separate one of a plurality of movement devices of the mobile drilling device, and wherein the plurality of movement devices are configured to move the mobile drilling device between locations.

2. The method of claim 1, wherein:
the user interface of the mobile computing device comprises a touch-screen display device;
receiving the user input comprises:
providing, on a display device of the mobile computing device, a display image comprising a two-dimensional drill movement control portion; and
receiving user input representative of a user selection of one or more points within the two-dimensional drill movement control portion; and
generating the plurality of control signals based on the data received from the mobile computing device comprises generating the plurality of control signals to control movement of all of the plurality of movement devices based on user input representative of a single touch input selection of one or more points within the two-dimensional drill movement control portion.

3. The method of claim 2, wherein the user input representative of a user selection of one or more points within the two-dimensional drill movement control portion comprises user input representative of movement across a part of the touch-screen display device corresponding to the two-dimensional drill movement control portion.

4. The method of claim 3, further comprising transforming, using at least one of the mobile computing device or the control circuit, the user input representative of the movement across the part of the touch-screen display device corresponding to the two-dimensional drill movement control portion into separate data portions corresponding to a desired movement of each of the plurality of movement devices.

5. The method of claim 4, further comprising, for each movement device, a control map comprising a plurality of movement level zones, wherein each of the plurality of movement level zones for a movement device is associated with a different portion of the two-dimensional drill movement control portion and a different speed of movement of the movement device, and wherein the speed of movement of the movement device resulting from the user input is determined based on one or more movement level zones of the plurality of movement level zones that contain the one or more points within the two-dimensional drill movement portion that are selected by the user.

6. The method of claim 4, further comprising, for each movement device, a control map comprising a substantially continuous movement level gradient, wherein the movement level gradient for a movement device is associated with at least a part of the two-dimensional drill movement control portion, and wherein a speed of movement of the movement device resulting from the user input is determined based on a part of the movement level gradient that contains the one or more points within the two-dimensional drill movement portion that are selected by the user.

7. The method of claim 3, wherein generating the plurality of control signals based on the data received from the mobile computing device comprises generating control signals configured to control a direction and speed of movement of the mobile drilling device based on the user input representative of movement across a portion of the two-dimensional drill movement control portion.

8. The method of claim 3, wherein the two-dimensional drill movement control portion comprises a virtual joystick.

9. The method of claim 3, wherein the two-dimensional drill movement control portion comprises a rectangular area within the display image.

10. The method of claim 2, wherein:
receiving the user input further comprises:
providing a plurality of individual movement device control portions within the display image, wherein each individual movement device control portion is associated with one of the plurality of movement devices; and
receiving user input representative of a user selection of one or more points within one or more of the plurality of individual movement device control portions; and
generating the plurality of control signals based on the data received from the mobile computing device comprises generating the plurality of control signals based on either the user input representative of a user selection of one or more points within the two-dimensional drill movement control portion or the user input representative of a user selection of one or more points within one or more of the plurality of individual movement device control portions, and wherein generating the plurality of control signals based on the user input representative of a user selection of one or more points within one or more of the plurality of individual movement device control portions comprises generating control signals configured to control each of the plurality of movement devices based on a portion of the user input corresponding to the individual movement device control portion associated with the movement device.

11. The method of claim 1, wherein the mobile computing device comprises one of a mobile telephone or a tablet computing device.

12. A non-transitory computer-readable storage medium having instructions stored thereon that, when executed by a processor of a mobile computing device, cause the processor to perform operations comprising:
  providing, on a touch-screen display device of the mobile computing device, a display image comprising a two-dimensional drill movement control portion;
  receiving user input representative of user movement across a part of the touch-screen display device corresponding to the two-dimensional drill movement control portion; and
  transmitting data based on the user input to a mobile drilling device over a wireless network connection, wherein the data is configured to cause the mobile drilling device to control movement of a plurality of movement devices of the mobile drilling device based on the user input representative of the user movement across a part of the touch-screen display device corresponding to the two-dimensional drill movement control portion, wherein the plurality of movement devices are configured to move the mobile drilling device between locations.

13. The non-transitory computer-readable storage medium of claim 12, wherein the instructions are further configured to cause the processor to transform the user input representative of the movement across the part of the touch-screen display device corresponding to the two-dimensional drill movement control portion into separate data portions corresponding to a desired movement of each of the plurality of movement devices, and wherein transmitting data based on the user input to the mobile drilling device comprises transmitting the separate data portions to the mobile drilling device.

14. The non-transitory computer-readable storage medium of claim 12, wherein the data is further configured to cause the mobile drilling device to control a direction and speed of movement of the mobile drilling device based on the user input representative of movement across a portion of the two-dimensional drill movement control portion.

15. The non-transitory computer-readable storage medium of claim 12, wherein the two-dimensional drill movement control portion comprises a virtual joystick.

16. The non-transitory computer-readable storage medium of claim 12, wherein the instructions are further configured to cause the processor to:
  provide a plurality of individual movement device control portions within the display image, wherein each individual movement device control portion is associated with one of the plurality of movement devices; and
  receiving user input representative of a user selection of one or more points within one or more of the plurality of individual movement device control portions;
  wherein the data is configured to cause the mobile drilling device to control movement of a plurality of movement devices based on either the user movement across a part of the touch-screen display device corresponding to the two-dimensional drill movement control portion or the user input representative of a user selection of one or more points within one or more of the plurality of individual movement device control portions.

17. A mobile drilling device comprising:
a control circuit comprising a processor operably coupled to at least one memory and configured to:
  receive, from a mobile computing device comprising a touch-screen display device over a wireless network connection, data based on user input representative of movement across a part of the touch-screen display device corresponding to a two-dimensional drill movement control portion of a display image provided on the touch-screen display device;
  generate a plurality of control signals based on the data received from the mobile computing device, wherein each of the plurality of control signals is configured to control movement of a separate one of a plurality of movement devices of the mobile drilling device, and wherein the plurality of movement devices are configured to move the mobile drilling device between locations, wherein the control circuit is configured to generate the plurality of control signals to control movement of all of the plurality of movement devices based on user input representative of a single touch input selection of one or more points within the two-dimensional drill movement control portion.

18. The mobile drilling device of claim 17, wherein the control circuit is configured to transform the data based on the user input representative of the movement across the part of the touch-screen display device corresponding to the two-dimensional drill movement control portion into separate control signals configured to control the movement of each of the plurality of movement devices.

19. The mobile drilling device of claim 17, wherein the control circuit is configured to control a direction and speed of movement of the mobile drilling device based on the user input representative of movement across a portion of the two-dimensional drill movement control portion.

* * * * *

UNITED STATES PATENT AND TRADEMARK OFFICE
CERTIFICATE OF CORRECTION

PATENT NO. : 9,026,270 B2
APPLICATION NO. : 13/895625
DATED : May 5, 2015
INVENTOR(S) : Poettker et al.

Page 1 of 1

It is certified that error appears in the above-identified patent and that said Letters Patent is hereby corrected as shown below:

In the specification,

Column 9, line 56, delete "Industrial Applicability" and insert --INDUSTRIAL APPLICABILITY--.

Signed and Sealed this
Twenty-third Day of February, 2016

Michelle K. Lee
*Director of the United States Patent and Trademark Office*